United States Patent [19]

Mutoh et al.

[11] Patent Number: 4,673,951

[45] Date of Patent: Jun. 16, 1987

[54] TONE REPRODUCIBLE INK JET PRINTER

[75] Inventors: Masayuki Mutoh, Machida; Shinji Kamiyama, Tokyo, both of Japan

[73] Assignee: Minolta Camera Kabushiki Kaisha, Osaka, Japan

[21] Appl. No.: 780,821

[22] Filed: Sep. 27, 1985

[30] Foreign Application Priority Data

Sep. 29, 1984 [JP] Japan ................................ 59-204380

[51] Int. Cl.[4] ................................................ G01D 15/18

[52] U.S. Cl. .......................................... 346/75; 358/298

[58] Field of Search ........................... 346/75; 358/298

[56] References Cited

U.S. PATENT DOCUMENTS

| | | | |
|---|---|---|---|
| 3,416,153 | 12/1968 | Hertz et al. | 346/75 |
| 3,916,421 | 10/1975 | Hertz | 346/75 |
| 3,947,851 | 3/1976 | Chen et al. | 346/1.1 |
| 3,977,007 | 8/1976 | Berry et al. | 346/1.1 |
| 3,992,713 | 11/1976 | Carmichael et al. | 346/75 |
| 4,065,773 | 12/1977 | Berry | 346/75 |
| 4,524,364 | 6/1985 | Bain et al. | 346/1.1 |

OTHER PUBLICATIONS

Ink Jet Color Graphics, Peter Duffield, pp. 248–250. Journal of Applied Photographic Engineering, vol. 5, No. 4, Fall, '79.

Ink Jet Color Printing Method, Mitsuo Tsuzuki and Touru Usubuchi, pp. 185–188, Proceedings of 14th Joint Conference on Image Technology, '83.

*Primary Examiner*—E. A. Goldberg
*Assistant Examiner*—Gerald E. Preston
*Attorney, Agent, or Firm*—Wenderoth, Lind & Ponack

[57] ABSTRACT

There is disclosed an ink jet printer of Hertz type. An ink jet is continuously forced out from a nozzle and broken into minute droplets. The droplets are selectively charged by applying pulse voltage. A row of charged droplets is removed and a row of uncharged droplets proceeds to the record medium and forms a dot thereon. The pulse width is controlled in order to allow a number of droplets included in one row of droplets, so that the diameter of dot is altered. The ink jet printer is able to produce high degree of tones by alteration of number of uncharged droplets in combination of the dot pattern moduration method or the dither method.

6 Claims, 18 Drawing Figures

TONE REPRODUCIBLE INK JET PRINTER

FIELD OF THE INVENTION

The present invention relates to a tone reproducible ink jet printer, and more particularly to an ink jet printer resorting to the on-off modulation technique which is one of the ink jet techniques proposed by Hertz.

BACKGROUND OF THE INVENTION

Hertz's ink jet techniques are disclosed in U.S. Pat. Nos. 3,416,153 and 3,916,421 and provide high resolution and high precision. With Hertz's on-off modulation technique, an ink jet is continuously forced out from a nozzle and broken into minute drops or droplets in flight. The nozzle is internally provided with an electrode for charging the ink, while a deflection electric field is set up between the nozzle and a record medium. Accordingly, when the voltage source for charging the ink is turned on and off, a row of charged droplets is removed by the deflection electric field, permitting a series of uncharged droplets only to proceed toward the record medium. The series of droplets impinges on a point on the record medium to form a dot.

When a computer output or the like is to be printed out, each character is expressed by selectively marking some of a plurality of pixels (picture elements) which are divided in the form of a matrix.

Journal of Applied Photographic Engineering, Vol. 5, No. 4, Fall 1979, pages 248 to 250, "Ink Jet Color Graphics" introduces a method of modulating the density of dots constituting one pixel in order to produce tones with use of Hertz's technique. With reference to FIG. 1 illustrating this method, the pixel is constituted in the form of a submatrix, and the number of dots to be marked within the submatrix of definite area is changed for the modulation of dot density. This method will hereinafter be referred to as dot pattern modulation. FIG. 1 shows dot patterns provided by 4×4 dot-distributed submatrices. The dot patterns, including a submatrix with no dot, produce tones in 17 steps.

When such method of dot pattern modulation is to be used for a wider range of tone reproduction with a high resolution, the total number of dots to be recorded as well as the dot density greatly increases. For example, when images are recorded on A4-size paper in 64 tones with a resolution of 5 pixels/mm, a total of about $10^8(210\times5\times297\times5\times64)$ dots need to be recorded at a dot density of $30(5\times8)$ dots/mm. Such increases of dot number and density reduce the velocity of recording.

For the high-speed recording of images with a high resolution and high degree of tone reproduction, Proceedings of 14th Joint Conference on Image Technology, 8-1(1983), pages 185 to 188 proposes the combination of the multi-level dither method, a technique for tone reproduction, and a method of varying the size of ink jet droplets. The ink jet device used in this proposal is of the on-demand type wherein the nozzle is provided with a piezoelectric crystal, and pressure is applied to eject a jet of droplets only when recording. The droplet size is modulated by varying the voltage to be applied to the piezoelectric crystal. The proposal has the following drawbacks. One of them is that because the droplet size per se is varied, the viscous resistance of air to which the droplets are subjected in flight produces displaced dots on the record medium. As another drawback, the device is difficult to control in giving different droplet sizes with good stability. It is also difficult to produce individually stabilized droplets.

SUMMARY OF THE INVENTION

Accordingly, the main object of the present invention is to provide a high-speed ink jet printer having a high resolution and a high degree of tone reproducibility.

Another object of the present invention is to combine a tone reproduction technique with a technique for varying the size of dots to be recorded on a record medium for use in a jet ink printer of the Hertz type to realize a high resolution and a high degree of tone reproducibility.

Still another object of the invention is to provide a device for modulating the size of dots which is suited to ink jet printers of the Hertz type.

These and other objects can be fulfilled by an ink jet printer in which an ink jet generator and a record medium are moved relative to each other for recording and which is characterized in that the ink jet generator includes a device for continuously ejecting an ink jet from a nozzle, a device for applying a pulse voltage to the ink to selectively charge ink droplets and a device for producing a deflection electric field for deflecting a row of charged droplets and permitting a row of uncharged droplets to proceed straight, the ink jet printer further comprising means for storing data for tone reproduction including data as to the position to be marked with dots and dot diameter, means for controlling the relative movement based on the data as to the dot marking position, and means for controlling the pulse width of the voltage to be applied by the voltage applying device based on the the dot diameter data.

More specifically, the pulse width control means includes a PLL circuit which oscillates at N times the frequency of a reference clock, a shift register which receives the output of the PLL circuit and delivers a plurality of outputs of different phases, and a selection circuit for selecting one of the outputs of different phases based on the dot diameter data. The numerical value N which determines the oscillation frequency of the PLL circuit is not smaller than the number of tones associated with the modulation of the dot diameter and is not larger than the jet drop formation frequency divided by the reference clock frequency.

More specifically, the ink jet generator has an oscillator for controlling the formation of droplets, and the oscillation frequency of the oscillator is set to a value approximately equal to the spontaneous drop formation frequency of the ink jet. The oscillation of the oscillator is effected at M times the frequency of the reference clock, and M is equal to or greater than the value N relating to the PLL circuit. The oscillator may be driven with use of the output from the PLL circuit. Provided between the oscillator and a circuit for generating the oscillator oscillating signal is a delay circuit which is finely adjustable for synchronizing the formation of droplets and charging of droplets.

The features given above provide a tone reproducible ink jet printer. The number of droplets to be used for forming one dot can be changed by varying the pulse width of the charging signal. It is one of the features of Hertz' ink jet to form one dot from a plurality of (e.g., about 20) ink droplets. Because the size itself of individual droplets is varied in no way, the droplets travel stably to mark the record medium in position without deviation, despite the variation of the dot diameter. The droplets are formed continuously, and unused droplets are merely removed. This assures formation of droplets with high stability.

The present invention realizes reproduction of tones without any reduction of recording speed by combining the modulation of dot diameter with a tone reproducing technique such as dot pattern modulation or dither method.

BRIEF DESCRIPTION OF THE DRAWINGS

These and other objects or features of the present invention will become apparent from the following description of a preferred emboidment thereof taken in conjunction with the accompanying drawings, in which.

DETAILED DESCRIPTION OF THE INVENTION

In the following description, like parts are designated by like reference numbers throughout the several drawings.

According to the present invention, Hertz's ink jet recorder is used, the principle of which will be described first as the background. Hertz's ink jet systems are classified into the intensity modulation type and the on-off modulation type. The on-off modulation type is used for this invention.

Figure 1:
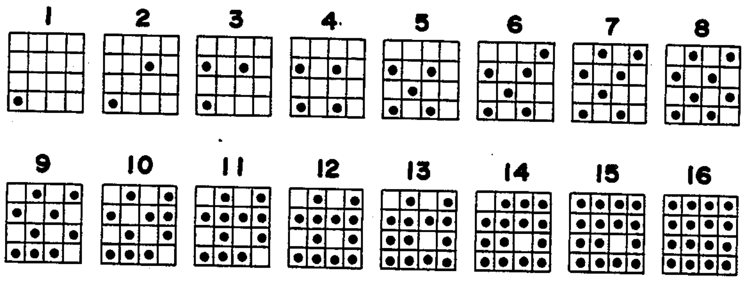
FIG. 1 PRIOR ART
FIG. 1 shows tone patterns in 16 steps according to dot pattern modulation.
Figure 2:
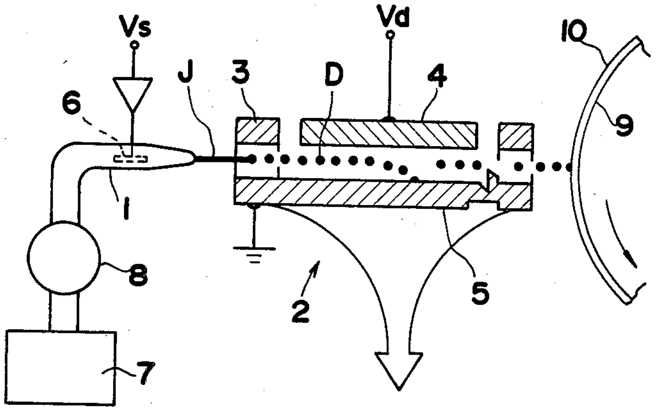
FIG. 2 PRIOR ART
FIG. 2 is a diagram schematically showing an ink jet generator of the Hertz type.

FIG. 2 is a diagram in section showing a record head for use in Hertz's ink jet systems of the on-off modulation type. The head comprises a nozzle 1 having an orifice diameter of 15 micrometers and a porous control electrode 2. The latter is divided into a grounded annular charge electrode 3, a deflection electrode 4 and a ground electrode 5 opposed to the electrode 4. A d.c. voltage Vd of 1.5 kV is impressed on the deflection electrode 4 to set up between the electrode 4 and the ground electrode 5 a deflection electric field intersecting the nozzle axis at right angles therewith. On the other hand, the nozzle 1 has internally disposed therein an electrode 6 to which a charge signal Vs is applied.

Figure 3:
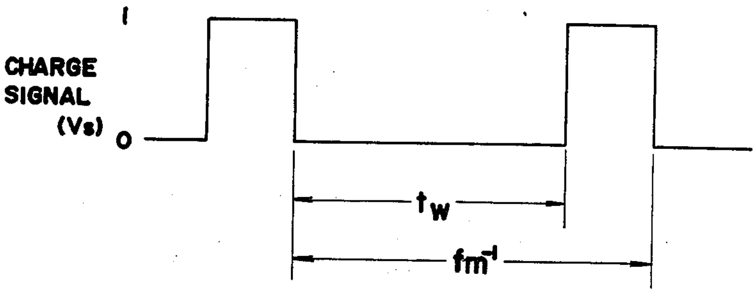
FIG. 3 PRIOR ART
FIG. 3 is a diagram showing the charge signal to be applied to a nozzle.

An ink drawn off from an ink tank 7 and pressurized to 3.9 MPa (40 atm.) is led to the nozzle 1 and then ejected from the orifice in the form of a hollow cylindrical jet at an initial velocity of about 40 m/sec. By the action of surface tension, the jet is broken up into a row of droplets about 25 micrometers in diameter. The drop formation frequency fd for the jet which is continuously ejected is about $10^6$ Hz, and the row of droplets is modulated by being charged with a rectangular wave charge signal (see FIG. 3) having a frequency fm of 50 kHz. While travelling through the deflection electrode, the row of charged droplets is dispersed in the form of a spray by electrostatic repulsion and viscous resistance of air, then deflected toward the ground electrode 5 and drawn off for removal. A row of uncharged droplets only proceeds straight and marks a dot on record paper 10 wound around a rotary drum 9.

When the jet of drop formation frequency fd Hz is modulated at a frequency of fm Hz at a low level period tw, one pulse of the charge signal covers (fd·tw) number of ink droplets D, which form one dot on the record paper. In the case of the above example, fd$=10^6$ Hz and tw=20 microseconds, hence (fd·tw)=20. Thus, about 20 ink droplets produce one dot.

Figure 4:
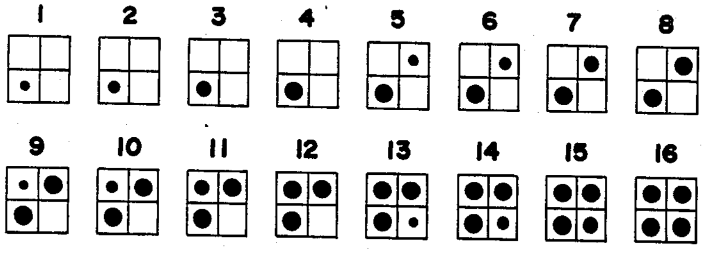
FIG. 4 shows tone reproduction patterns provided by the combination of dot pattern modulation and dot diameter modulation according to the invention.

The ink jet recorder of the present invention is so adapted that the pulse width tw is variable. The number of ink droplets forming one record dot, as well as the diameter of dots, is variable by the modulation of the pulse width, which further makes possible tone reproduction by the combination of dot pattern modulation and several stepwise varying dot diameters or by the combination of multi-level dither and variations of dot diameter. For example, FIG. 4 shows reproduction of 16 tones by the combination of four different dot diameters and dot pattern modulation with (2×2) submatrices. The number of tones reproduciable is 17, inclusive of a blank expression (with no dot), as is the case with the (4×4) submatrices shown in FIG. 2. Because the ink droplets are emitted continuously, the individual droplets have a stable initial velocity. Further because the individual droplets have a constant diameter without any variations, the viscous resistance of air to be encountered during the flight of the droplets is constant. It is therefore almost unlikely that the difference in the viscous resistance will result in the deviation of record dots.

When controlling charging or uncharging of the jet by a charge voltage, it is desirable that the charging be synchronized with droplet formation. Stated more specifically, record images of improved quality is available by controlling the phase of the charge voltage in such manner that a sufficiently high voltage will be applied to the hollow cylindrical jet at the moment the jet is broken up into droplets when forming charged droplets and that the charge voltage will be completely 0 V when forming uncharged droplets. With the ink jet of the Hertz type, one record dot is formed from several tens of ink droplets, so that improperly phased voltage will not pose a serious problem but still permits occurrence of mist or the like which influences the image quality. This will be described below.

Figure 5:
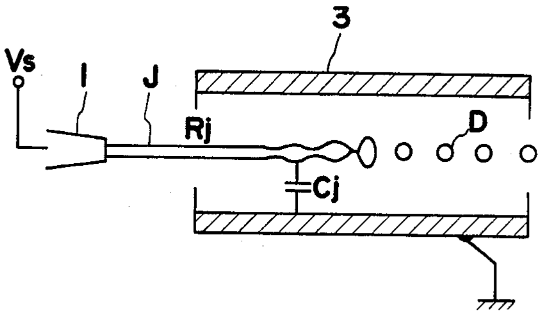
FIG. 5 is a diagram illustrating formation of ink jet droplet according to the invention.

The jet is charged utilizing an electrostatic induction phenomenon occurring between the jet and the charge electrode 3. With reference to FIG. 5, when a positive charge voltage Vs is applied to the ink, the capacitance Cj between the jet J and the charge electrode 3 is charged through the resistance Rj of the jet J. At this time, the charge Qj on the jet in steady state is equal to CjVs.

The jet is charged with a rectangular wave voltage which is quick to rise and fall to the greatest possible extent. However, since Rj and Cj provide an integration circuit, the jet is charged with the time constant CjRj. Thus, the jet is charged invariably at the time constant which is definite. Preferably the time constant is sufficiently smaller than the drop formation frequency (1/fd). If it is too great, charging-uncharging will not be effected in a binary mode, with the result that the ink droplets formed at the moment when the charge voltage rises or falls will be charged to an intermediate level to impair the image quality (see drops at the right of FIG. 6).

The time constant can be made smaller by decreasing Cj or Rj, but if Cj is decreased, the charge voltage Vs needs to be elevated in order to obtain the required Qj, hence undesirable. Accordingly, it is more advantageous to decrease Rj, i.e., the specific resistance of the ink. Nevertheless, there is a limit also to the reduction of the specific resistance because of other limiting factors of the ink. Presently, CjRj and 1/fd are at a comparable level. It therefore follows that unless the charging and droplet formation are effected with the same timing, droplets will be charged to an intermediate level as illustrated at the right side portion of FIG. 6.

On the other hand, the drop formation frequency fd fluctuates above and below an average value, i.e., the spontaneous drop formation frequency which is dependent straightforwardly on the properties of the ink, the nozzle orifice diameter and the flow rate of the ink. Accordingly even if the charging timing is made to agree with average drop forming timing, the fluctuation is likely to permit charging to an intermediate level. It is known to eliminate this fluctuation by an oscillator attached to the nozzle for giving forced oscillation to the nozzle from outside. The frequency of the forced oscillation is made approximately equal to the spontaneous drop formation frequency. The droplet formation of the jet then resonates with the forced oscillation, whereby droplets are obtained with high stability.

Figure 6:
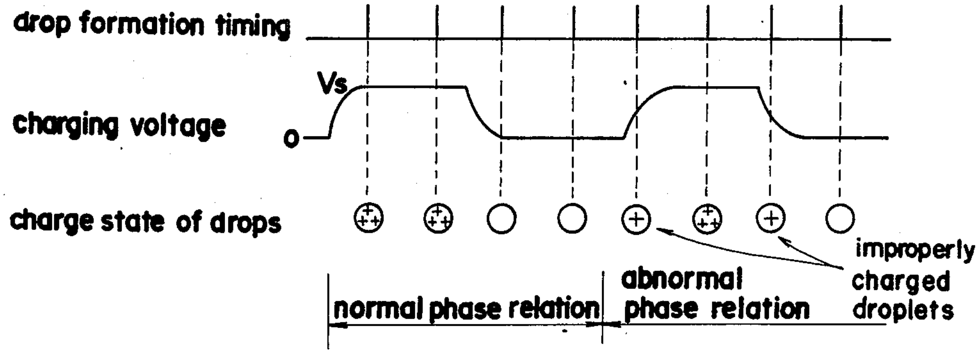
FIG. 6 is a diagram illustrating droplets as charged.

Because several tens of droplets form one record dot in the case of usual Hertz's ink jet recorders, the fluctuation poses no particular problem. With the ink jet recorder of the Hertz type according to the invention, however, the nozzle 1 is equipped with an oscillator to stabilize the drop formation frequency and thereby assure binary control of droplet charging-uncharging effectively. As seen at the left of FIG. 6, the phase of charging voltage is timed with the forced oscillation of the oscillator.

Figure 7:
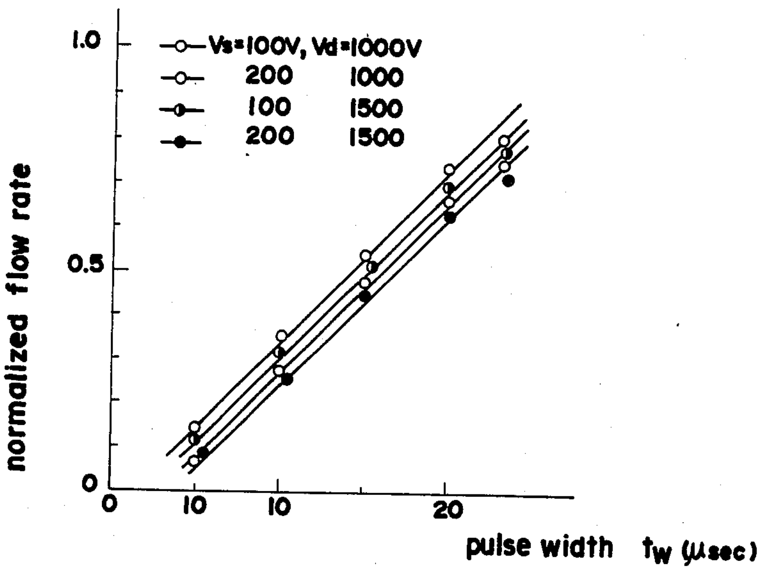
FIG. 7 is a graph showing the relation between the flow rate of ink and the pulse width of pulse voltage applied to the ink.

FIG. 7 shows the relation between the pulse width tw of a pulse-width modulated jet and the flow rate of ink used for recording (normalized to a value when all ink droplets are used for recording), as determined with an ink jet recorder of the pulse-width modulated on-off modulation type. In the graph, Vs stands for the charge voltage, and Vd the voltage on the deflection electrode. In this case, the jet is produced under a pressure of 40 atm. and modulated at 40 kHz. It is seen that since the flow rate of the ink is in proportion to the number of droplets, the number of droplets varies in rectilinear relation with the pulse width.

The pulse-width modulation of the ink jet of the Hertz type described above produces no changes whatever on the diameter and initial velocity of ink droplets. Accordingly there is no need to give consideration to the stabilization of the initial velocity and the difference of the viscous resistance to which the droplets in flight is subjected, mentioned with reference to the prior art. Further in the case of the continuous jet, the flow rate and drop formation frequency are stable, intermediate dot sizes are therefore stable, and reproduction of tones is unlikely to involve undesired variations. FIG. 7 shows that the dots are easily controllable in four different diameters.

Next, an embodiment of the invention will be described in detail.

Figure 8:
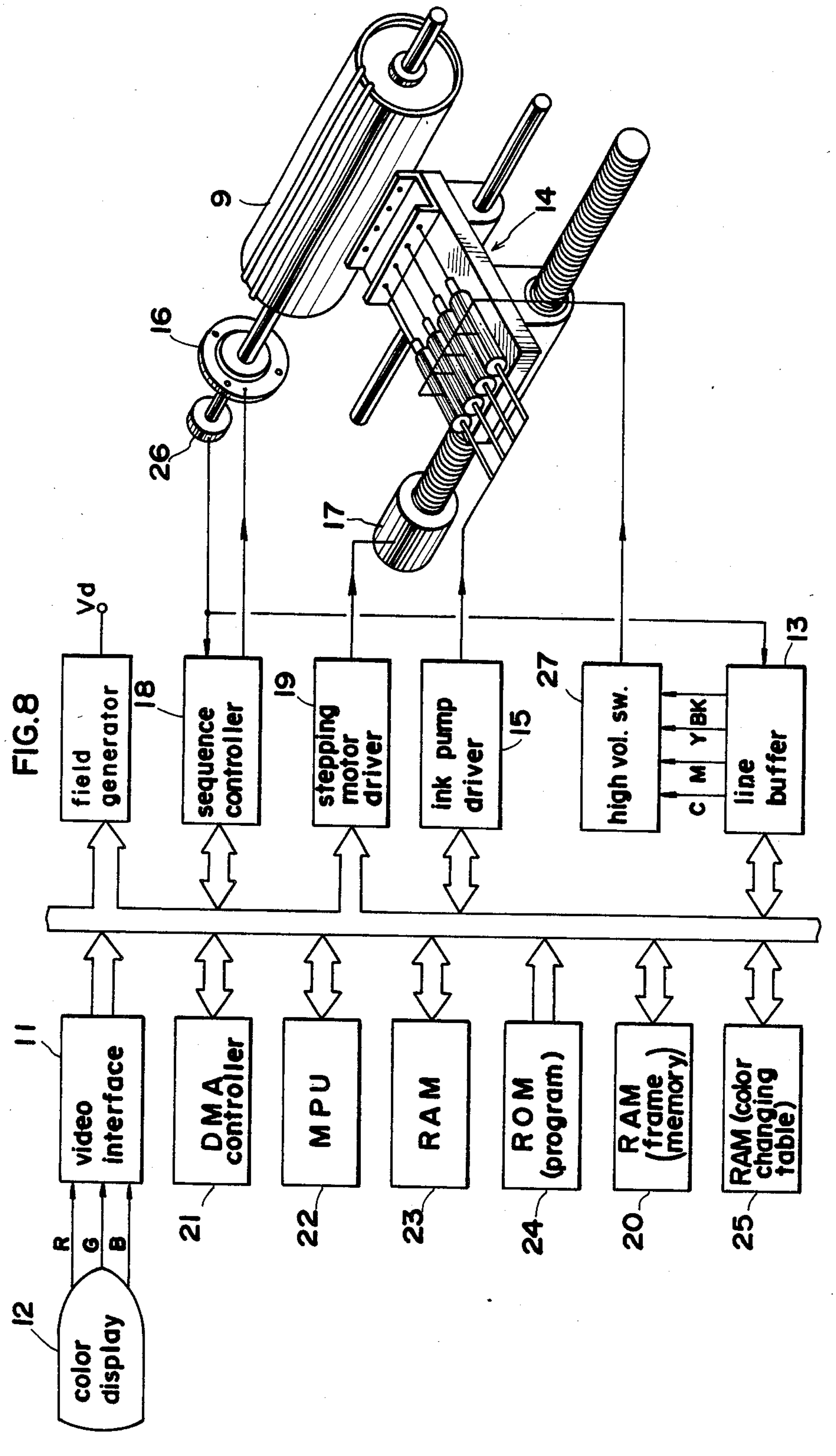
FIG. 8 is a diagram showing a system for controlling the ink jet printer according to the invention.

FIG. 8 is a block diagram showing an example of ink jet video printer for making hard copies of images on a color CRT display 12 connected to the printer via a video interface 11. The printer differs from conventional video printers in respect of part of the construction of a line buffer 13 and part of a firmware for reproducing tones, which will be described later. The video printer is a rotary drum printer. A record head 14 is provided with the nozzle 1 and the control electrode 2, already described with reference to FIG. 2, for each of four colors (C, M, Y, Bk). No deflection electrode or deflection high voltage source is shown. A record medium is wound around a record drum 9 by an unillustrated feeder and clamped. A drum motor 16 rotates the drum 9 for primary scanning, and the head 14 is intermittently moved by a stepping motor 17 axially of the drum for secondary scanning, whereby the record surface is scanned. Jets on-off modulated by image signals are impinged on the record medium to record an image. On completion of recording, the record medium is removed from the drum 9 by unillustrate discharge means. The drum motor 16 is controlled by a sequence controller 18. The stepping motor 17 is driven by a stepping motor driver 19. Ink pumps 8 are driven by an ink pump driver 15. Usable as the means for feeding the record medium to the drum 9, winding the medium around the drum and removing the medium therefrom are those disclosed in U.S. patent application Ser. No. 551,927 filed on November 15, 1983.

The R, G and B signals (image signals) from the display 12 are subjected to A/D conversion by the video interface 11 and transferred to a frame memory 20 by DMA (direct memory access). The data transfer by DMA is controlled by a DMA controller 21. The R, G, B data written in the frame memory 20 is processed, as color-converted (R, B, G→C, M, Y, Bk) for each pixel, into dot patterns by a microprocessor 22 and RAM 23 accordihg to a source programs stored in a ROM 24 and to a color conversion table provided in a RAM 25, followed by correction of nozzle position for each color. The patterns are then sent to the line buffer 13. Dot patterns for reproducing tones are prepared according to the color conversion table 25 simultaneously with the color conversion. According to the present invention, the $2\times2$ dot submatrices shown in FIG. 4 are used as the dot patterns.

The line buffer 13 comprises two RAM's having a capacity corresponding to one horizontal line of the CRT 12 for each of C, M, Y and Bk. The data processed as above and stored in the RAM is read out item by item in response to dot clock signals from a shaft encoder 26 coupled directly to the drum shaft. The dot clock signals correspond to the dots to be marked, respectively. The data read out is delivered via a high voltage switch 27 as charge signals, by which the jets are modulated to record an image. The data writing by the microprocessor 22 and data reading responsive to dot clock signals are done alternately by the two RAM's for each color.

Figure 9:
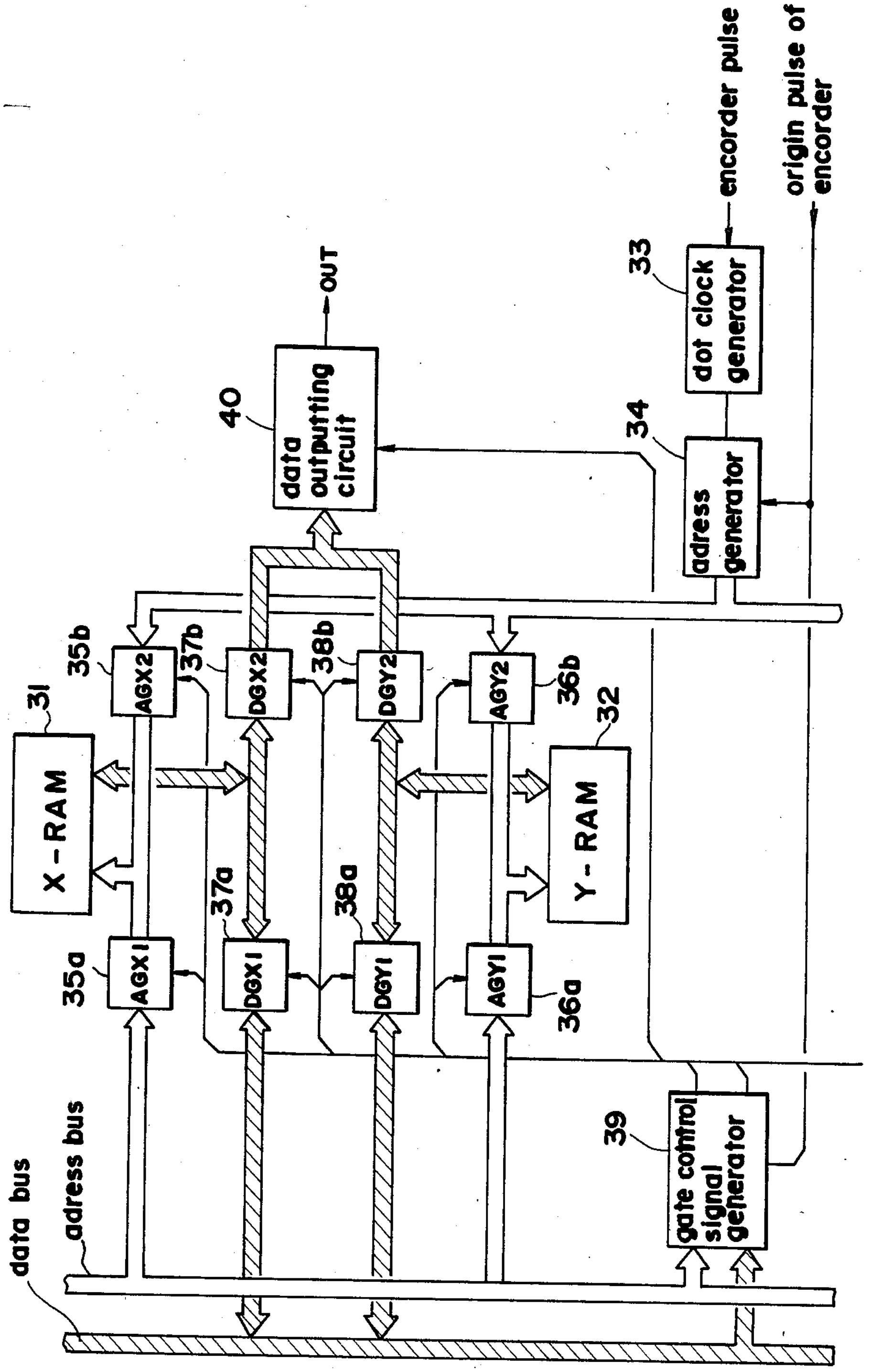
FIG. 9 is a block diagram showing in detail the construction of a line buffer according to the invention.

FIG. 9 is a block diagram showing in detail the line buffer 13 for one color. The line buffer 13 comprises two RAM's (X-RAM 31,Y-RAM 32) each having a capacity for one horizontal line of the CRT, a dot clock generator 33 for preparing jet modulating dot clock signals from an encoder pulses, an address generator 34 for producing RAM reading addresses responsive to dot clock signals, address gates ($AGX_1$35*a*, $AGX_2$35*b*, $AGY_1$36*a*, $AGY_2$236*b*) and data gates ($DGX_1$37*a*, $DGX_2$37*b*, $DGY_1$38*a*, $DGY_2$38*b*) for controlling writing and reading for RAM, a generator 39 for producing signals for controlling these gates, and a data output circuit 40 for selecting which bit of read RAM data is to be delivered. The gates 35*a*, . . . , 38*b* and the data output circuit 40 are controlled by command data from the microprocessor 22 and are changed over in synchronism with an origin pulse from the encoder 26. The origin pulse also clears a counter within the address generator 34, so that the data in the RAM's 31, 32 is read out from the start address. For example, when X-RAM 31 is used for writing data by the microprocessor 22, and Y-RAM 32 for reading data in response to clock signals, the gates $AGX_1$35*a*, $DGX_1$37*a*, $AGY_2$36*b*, $DGY_2$38*b* are in open state, and the gates $AGX_2$35*b*, $DGX_2$37*b*, $AGY_1$36*a*, $DGY_1$38*a* are in closed state. During the subsequent period, the open-closed state of these gates is reversed.

Figure 10:
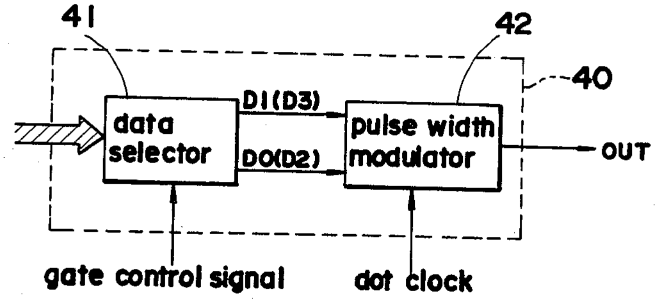
FIG. 10 is a block diagram showing in detail the data output circuit shown in FIG. 9.

Each color can be reproduced in 16 tones by the following arrangement using the combination of four kinds of dot density patterns as afforded by 2×2 dot submatrices and control of dots in four stepwise varying diameters. As shown in FIG. 10, the data output circuit 40 of the line buffer 13 comprises a data selector 41 and a pulse-width modulator 42 which is designed to give a pulse width corresponding to the 2-bit signal from the data selector 41, with the pulse falling as timed with occurrence of the falling edge of the dot clock signal (corresponding to the first of the uncharged droplets in a row to be recorded). To control the dot diameter or size, four different diameters can be expressed by two bits. The data output circuit 40 is designed to give two bits of output in the order of (D0, Dl)→(D2, D3) for every turn of rotation of the drum. The combination of (D0, Dl) or (D2, D3) provides four different pulse widths for controlling the dot size. The capacity of the RAM in this case corresponds to two turns of rotation of the drum; one horizontal line of the CRT is recorded by two revolutions of the drum.

Figure 11:
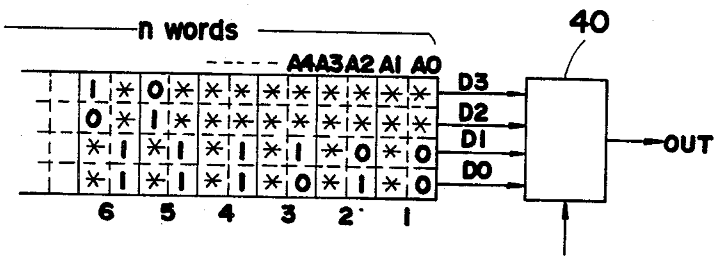
FIG. 11 is a diagram showing an arragement of data stored in the line buffer of FIG. 9.

FIG. 11 shows an arrangement of data within the RAM's 31 and 32. The dot patterns shown in FIG. 4 are arranged from address 0 in the order of indicator numbers 1, 2, 3,... The asterisks represent unconsidered data stored. Although not shown, data is additionally stored as to the presence or absence of the dot to be printed for each of the four dots constituting the 2×2 dot array. Before printing, therefore, data as to the presence or absence of dot and 2-bit data as to the dot diameter are read out.

Figure 12:
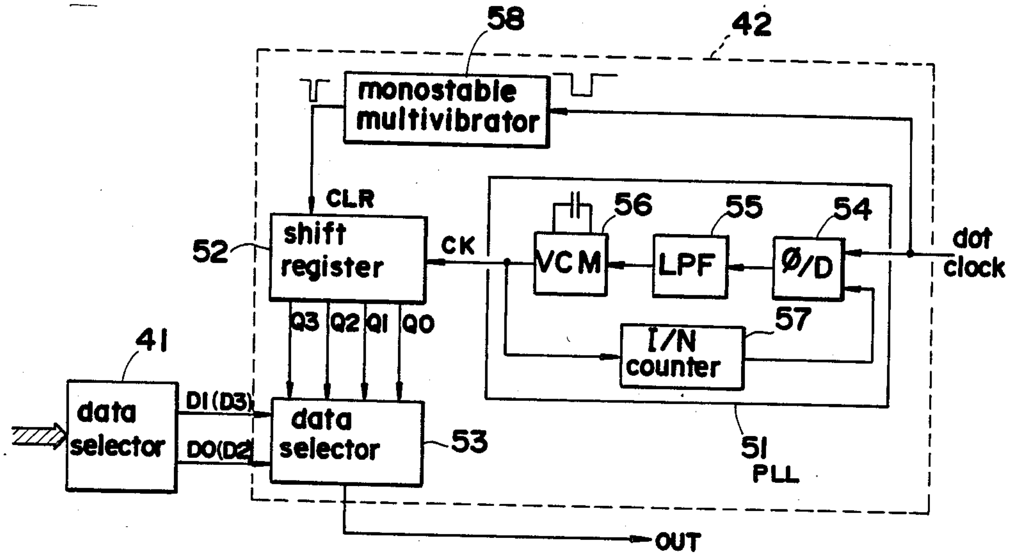
FIG. 12 is a block diagram showing in detail the pulse width modulator shown in FIG. 10.

With reference to FIG. 12 showing the pulse-width modulator 42, the modulator comprises a PLL (phase lock loop) circuit 51 which uses the dot clock signal as a reference signal and oscillates at N times the frequency of the dot clock, a shift register 52 and a data selector. The numerical value N is not smaller than the number of steps of the modulation of the dot diameter and is not larger than the jet drop formation frequency divided by the dot clock frequency. With the present embodiment, N is equal to the latter value. The PLL circuit 51 is a known circuit comprising a phase comparator 54, a low-pass filter 55 , a voltage control oscillator 56 and a counter 57.

Figure 13:
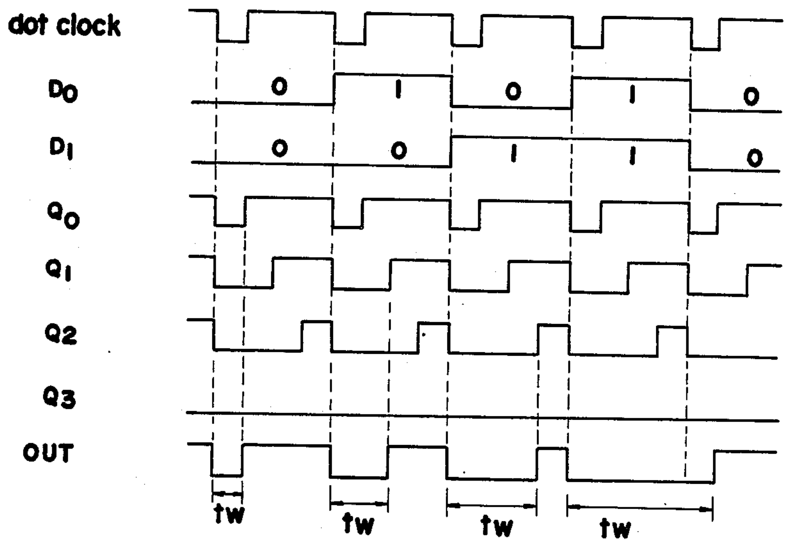
FIG. 13 is a time chart showing the state of signals in the circuit of FIG. 12.

The shift register 52 used is of the serial-in parallel-out type. Output terminals Q0, Ql, Q2 and Q3 are in the order of increasing delay time. With the fall of the dot clock signal, the output of the shift register is cleared to "0" via a monostable multivibrator 58 and subsequently becomes "1" in the order of Q0, Q1, Q2 and Q3 in response to the clock signal from the PLL circuit 51. The bit number for the shift register 52 is greater than the frequency dividing ratio N of the PLL circuit 51, and Q3 selects a delay time longer than the dot clock period. The outputs from Q0, Q2, Q3, Q4 are fed to the data selector 53, and one of the outputs is selected based on (D0, Dl) or (D2, D3), giving an output of modulated pulse width tw as designated by OUT in FIG. 13. The delay time for Ql, Q2, Q3 is so determined that the tone indicator and the density will be in a rectilinear relation.

Figure 14:
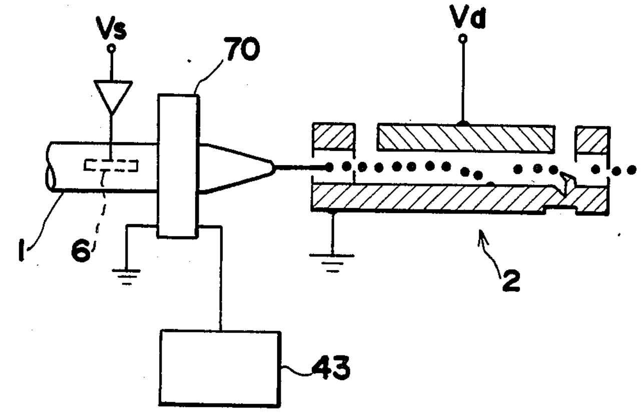
FIG. 14 is a diagram showing an oscillator as attached to the ink jet generator.
Figure 15:
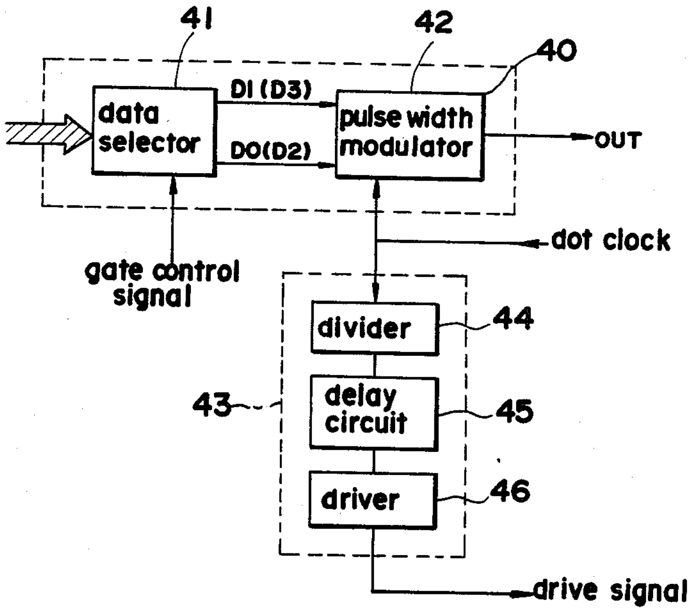
Figs. 15 and 16 are block diagrams showing a circuit for generating a drive signal for the oscillator.

As already described briefly, it is desirable to synchronize charging of droplets with formation of droplets to avoid charging of droplets to an intermediate level. Further to form droplets with improved precision, the nozzle is preferably provided with an oscillator. FIG. 14 shows a nozzle 1 equipped with a piezoelectric oscillator 70. The oscillator 70 is annular and fitted, as electrically insulated, around the nozzle 1 and is driven by a signal generated by a circuit 43 shown in FIG. 15. The oscillator drive signal generator circuit 43 is timed by a dot clock signal fed to a pulse generator circuit 40 for producing a charge signal. More particularly, the circuit 43 comprises a divider circuit 44 for subharmonizing the dot clock to the same frequency as the spontaneous drop formation frequency, a delay circuit 45 for finely adjusting the phase of the resulting signal and a driver 46 for forming the drive signal. The oscillation frequency of the oscillator is equal to or greater than the oscillation frequency of the PLL circuit. Accordinqly both the frequency is prepared from the dot clock (reference clock) signal, and when the oscillation frequency of the oscillator is M times the frequency of the reference clock and N times the frequency of the PLL circuit, M≧N.

Figure 16:
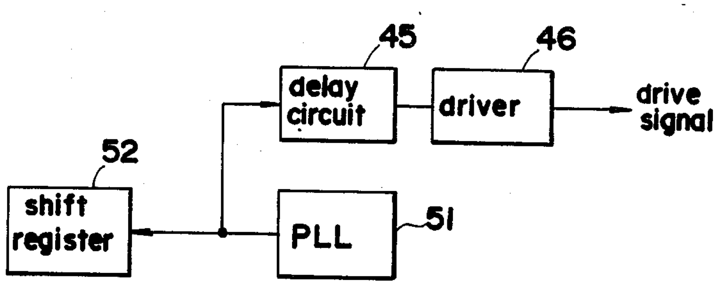

The oscillator drive signal, although prepared from the dot clock signal in the above example, may alternatively be prepared from the output of the PLL circuit 51 via a delay circuit 45 and a driver 46 as shown in FIG. 16.

The delay circuit 45 used can be a delay time variable delay line or serial-in serial-out shift register. When the shift register is used, a variable shift clock signal may be used.

Figure 17:
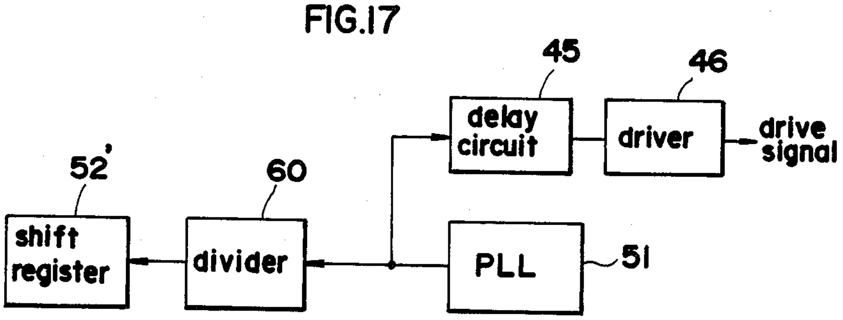
FIG. 17 is a block diagram showing a modification of the circuit FIG. 12.

FIG. 17 shows a modification wherein the shift register 52 for the pulse generator circuit 40 is simplified. For example when the dot clock frequency is 25 kHz and the drop formation frequency is 1 MHz, the shift register 52 in FIG. 12 must be at least 40 in bit number. The modification of FIG. 17 is so adapted that the output from the PLL circuit 51 is frequency-divided by a divider 60, the output of which is fed to a shift register 52' of lesser bit number. For example, when the frequency is divided by 3 for the variations of the dot diameter in about four steps, a shift register about 16 in bit number is usable. In this case also, the shift register outputs Q0, Ql, Q2, Q3 must be so selected that the tone level and the density will be in rectilinear relation to the greatest possible extent.

Figure 18:
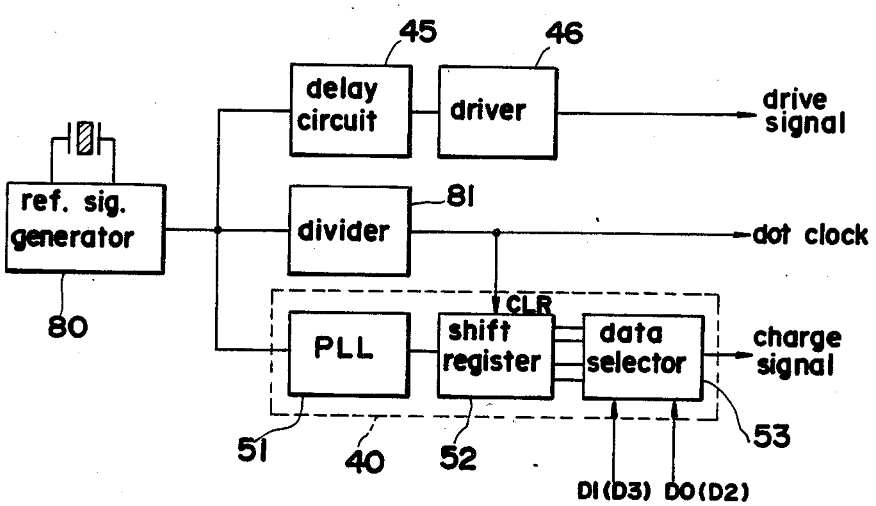
FIG. 18 is a block diagram showing a modification of the circuit for producing a droplet charge signal and an oscillator drive signal.

FIG. 18 shows a modified circuit for generating the droplet charging signal and oscillator drive signal. With the embodiment described above, various signals are generated with reference to the dot clock signal which is produced with the rotation of the drum. The modification of FIG. 18 is adapted to prepare various signals, inclusive of a dot clock signal, from a single reference signal. Indicated at 80 is a reference signal generator comprising a quartz oscillator or the like. The reference signal is fed to a delay circuit 45 and then to a driver 46, giving a drive signal for the oscillator 70. The reference signal is fed also to a pulse-width modulator 40, which affords a charge signal. Because the oscillator drive signal and the droplet charge signal are prepared from a single reference signal, formation of droplets is timed with charging of droplets. The reference signal is also frequency-divided by a divider 81 to give a dot clock signal, which is fed to the address generator 34 of FIG. 9 and used for the input-output control of the line buffer 13. The drum 9 is driven by a digital d.c. servo motor. The dot clock signal serves as a reference signal for driving the motor.

Although the foregoing embodiment employs the combination of dot diameter modulation and dot pattern modulation for reproducing tones, the tone reproduction of the present invention can be accomplished also by the combination of dot diameter modulation and the dither method, particularly multi-level dither. Since multi-level dither is known as a method wherein different threshold levels are used for the binary conversion of pixels of half-tone images, this method will not be described. According to the present invention, the diameter of dots corresponding to the pixels processed by the dither method is varied. Furthermore, the combination of dot pattern modulation and dot diameter modulation is applicable to the pixels processed by the dither method.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A tone reproducible ink jet printer in which an ink jet generator and a record medium are moved relative to each other for recording, the ink jet generator including an ejecting means for continuously ejecting an ink from a nozzle, a voltage applying means for applying a pulse voltage to the ink to selectively charge ink droplets and a means for producing a deflection electric field for deflecting a row of charged droplets and permitting a row of uncharged droplets to proceed straight such that one row of uncharged droplets forms one dot on the record medium, said printer comprising:

a means for storing data for tone reproduction including data as to the position to be marked with dots on the record medium and data as to dot diameter;

a reference clock generating means for generating a series of reference clock pulses;

a means for controlling the relative movement of the ink jet generator and the record medium based on said data as to the dot marking position in response to said reference clock pulses;

a pulsewidth controlling means for controlling the pulsewidth of the voltage to be applied by the voltage applying means based on said dot diameter data, said pulse-width controlling means comprising a PLL circuit which oscillates in response to said reference clock pulses at N times the frequency of said reference clock pulses, a shift register which receives an output from said PLL circuit and delivers a plurality of outputs of different phases, and a selection circuit for selecting one of said plurality of outputs of different phases based on said dot diameter data; wherein the numerical value of N which determines the oscillation frequency of said PLL circuit is not smaller than the number of tones associated with the modulation of the dot diameter and is not larger than a jet drop formation frequency divided by the reference clock frequency; and an oscillator means for controlling the formation of droplets in accordance with said reference clock pulses; wherein the oscillation frequency of said oscillation means is set to a value approximately equal to a spontaneous drop formation frequency of the ink jet and is effected at M times the frequency of said reference clock pulses, and wherein the numerical value of M is equal to or greater than said value N.

2. A tone reproducible ink jet printer as claimed in claim 1, wherein said pulse width controlling means further comprises a monostable multivibrator which receives said reference clock pulses and outputs a clear signal to said shift register, timed with respect to said reference clock pulses, for synchronizing the start of said outputs of said shift register with said reference clock pulses.

3. A tone reproducible ink jet printer as claimed in claim 1, wherein said oscillator means comprises an oscillator disposed on the nozzle, an oscillation signal generating circuit for generating oscillation signals and a delay circuit which is provided between said oscillator and said oscillation signal generating circuit and is finely adjustable for synchronizing the fornation and charging of droplets.

4. A tone reproducible ink jet printer as claimed in claim 3, wherein said oscillation signal generating circuit includes means for generating oscillation signals in accordance with said reference clock pulses.

5. A tone reproducible ink jet printer as claimed in claim 3, wherein said oscillation signal generating circuit includes means for generating oscillation signals in accordance with said outputs of said PLL circuit.

6. A tone reproducible ink jet printer as claimed in claim 1, wherein said dot position data stored in said data storing means is arranged so as to correspond to position data of dots which constitute each of pixels in accordance with the dot pattern modulation.

* * * * *